Nov. 26, 1929. W. S. PRITCHARD 1,737,094
WINDSHIELD WEATHER STRIP
Filed Dec. 21, 1925
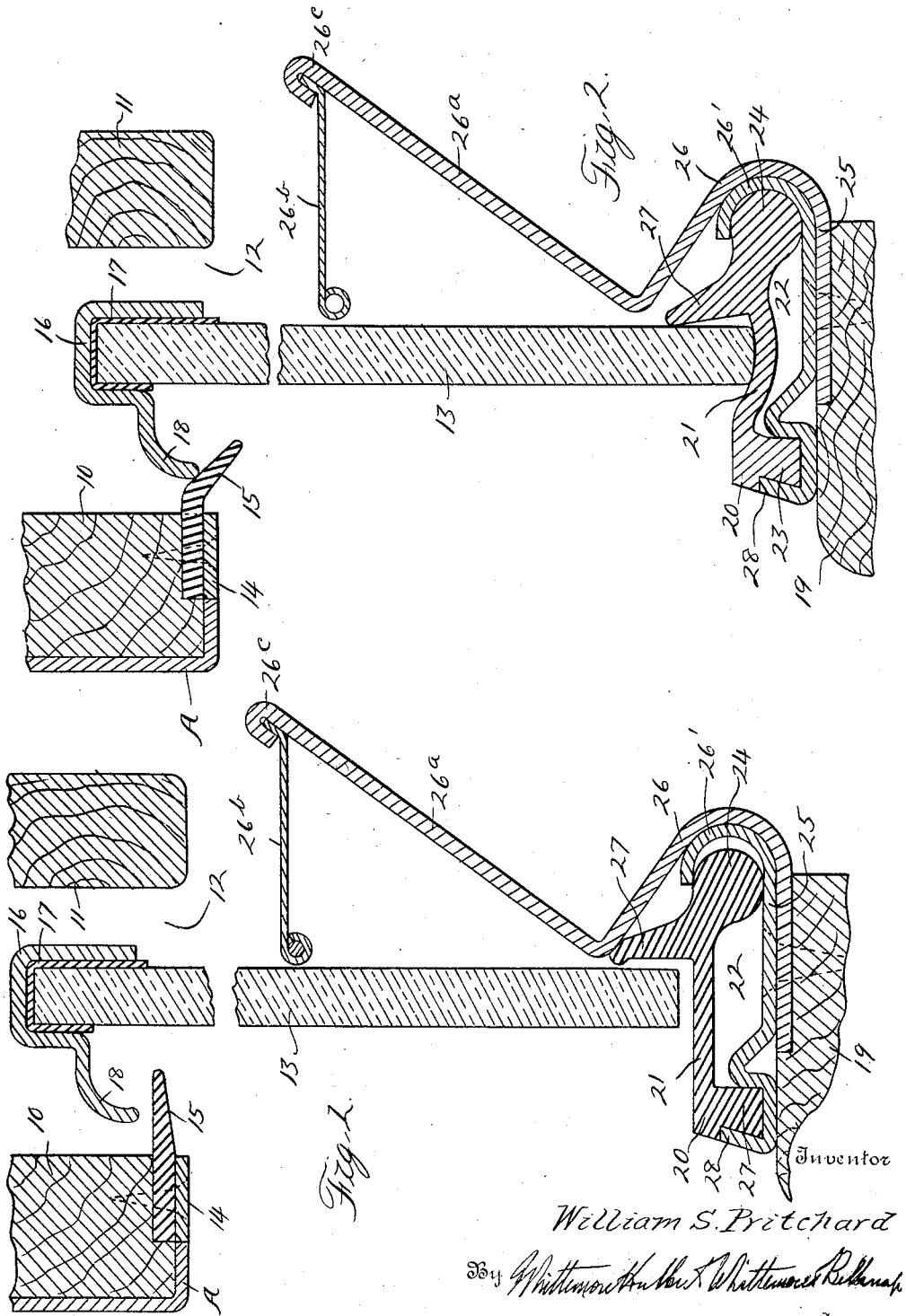

Patented Nov. 26, 1929

1,737,094

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

WINDSHIELD WEATHER STRIP

Application filed December 21, 1925. Serial No. 76,844.

This invention relates to windshields and more particularly to a sliding windshield construction involving weatherstrips or seals for weatherproofing the windshield.

The invention is distinguished by its simplicity of construction which enables the same to be expeditiously and economically manufactured and further by the ease and simplicity with which the same may be installed and operated.

The advantages of the invention are realized by the construction which consists in the provision of a compressible weather strip or seal arranged between the flanged upper edge of the windshield glass and the lower edge of the vehicle header whereby in the closed position of the windshield an effective weather proofing of this connection between the parts is attained, the construction being such, however, that the parts forming this weatherproofing connection are protected and concealed.

The invention also includes the novel construction of weather strip arranged adjacent the lower edge of the windshield glass and adapted to be engaged thereby. The weatherstrip is of a deformative construction and is adapted upon engagement by the lower edge of the windshield glass to be deformed into a multi-engaging position or condition whereby an extremely effective weather proofing seal is attained.

A further feature of the invention resides in a deflector for controlling the path of air flowing into the vehicle past the windshield when the latter is raised.

With these and other objects in view, the invention resides in the novel features of construction and combination and arrangements of parts as more fully hereinafter described and claimed.

Figure 1 is a side elevation view showing in cross section the windshield and sealing construction in accordance with my invention, the windshield being raised out of sealing engagement, and Figure 2 is a like view showing the windshield lowered into the sealing position.

Referring to the drawings wherein like reference characters indicate like parts I have illustrated a windshield header A of a vehicle, which in the form of construction herein illustrated, consists of a pair of complementary members or sections 10 and 11 spaced apart to provide a central passageway 12 to receive the windshield glass 13. Operating mechanism of any well-known or desired construction preferably of a power multiplying character (not shown) may be provided for effecting vertical movement of the windshield glass.

For providing an effective and concealed weatherproofing seal between the upper edge of the windshield glass and the lower edge of the header, I provide one of the header sections such as the section 10 with a strip 14 adapted to embrace a weatherstrip 15 preferably of a resilient or deformative material such as rubber, rubber composition or other suitable material. This strip 14 is preferably a continuation of an outer facing or finishing sheet 16, secured to the outer header section 10. The windshield glass 13 is provided with a border strip 16', 17 representing a suitable weatherstripping or sealing material located between the strip 16 and glass 13. The strip 16 has the lip or flanged portion 18 projecting laterally of the glass for sealing engagement with the weatherstrip 15. As the windshield glass 13 is lowered into its closed position the weatherstrip 15 is engaged by the lip or flange 18 and distorted to form an effective weatherproofing seal between the header and windshield glass.

Arranged preferably on the cowl 19 of the vehicle or other suitable adjacent vehicle structure is a weatherstrip 20. This weatherstrip consists of a body portion 21 recessed as at 22 to thus form spaced supporting ribs or portions 23 and 24 respectively which extend longitudinally of the weather strip. A weatherstrip supporting strip 25 secured, for instance, to the cowl 19 as shown co-operates to secure the weatherstrip 20 in place with a return-bent portion 26 of the deflector 26ª, the latter being secured to the cowl 19. If desired the portion 26 may be extended upwardly as at 26ª for deflecting the air upwardly above the heads of the occupants of the vehicle, after passage of the air underneath the glass 13 when the latter is raised. 26$^b$ is an air screen for filtering the air and thus preventing passage of dust, dirt, etc. into the vehicle. One edge of the screen 26$^b$ is preferably engaged between the outer return-bent portion 26$^c$ of the deflector 26$^a$, the opposite edge being rolled around a wire 26$^d$. The supporting rib or portion of the weatherstrip is preferably rounded in cross section to snugly fit within the curved flange 26' of the strip 25. The weatherstrip is further provided with an upwardly extending portion or projection 27 arranged preferably adjacent the curved supporting rib 24. The weatherstrip is of a deformative character being usually made of rubber, rubber composition, or other suitable similar material. The rib 23 may be clamped, to fixedly secure the front edge of the weatherstrip with respect to the cowl, by reason of the bent clamping portion 28 of the supporting strip 25.

When the windshield glass 13 is lowered it engages the weatherstrip body portion 21 and upon a continued movement of the glass in a downward direction the weatherstrip 20 is deformed or distorted into substantially the position, illustrated in Figure 2, wherein the center portion of the body 21 is depressed or collapsed while the projection or extension 27 thereof is moved laterally into contacting sealing relation with the face of the windshield glass. In effect the weatherstrip fulcrums about its rounded portion 24, lateral movement of the latter being limited by the curved flange 26', thus not only laterally moving the projection 27 into contacting relation with the glass but also forcing that portion of the weatherstrip engaged by the lower edge of the glass into intimate sealing engagement or contact therewith. Thus the deformation of the weatherstrip causes it to assume a multi-engaging position with reference to the windshield glass and produces an effective weatherproofing seal for the lower edge thereof.

It should be understood that the parts shown on cross section in the drawings extend longitudinally along the windshields, preferably for the entire width thereof.

While it is believed from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. In combination with a vehicle cowl and windshield, a supporting strip secured to said cowl having a return-bent portion and a channel-shaped portion, a weather strip comprising a body portion having a recess in the lower face forming spaced supporting ribs engageable respectively in said return-bent portion and channel-shaped portion and a projection on said weatherstrip contacting with said windshield upon an engagement of the latter with the body portion of said weatherstrip.

2. In combination with a vehicle cowl and windshield, a supporting strip having a substantially flat portion secured to said cowl and having a channel-shaped portion at one edge and a return bent portion at the opposite edge, a weatherstrip comprising a body portion having a recess in the lower face thereof forming spaced ribs, one of said ribs positioned in said channel-shaped portion and the other of said ribs having a sliding engagement with the flat portion of said supporting strip and operable upon an engagement of the windshield with the weather strip to snugly engage said return bent portion, and an upstanding projecting portion on said weather strip arranged to contact with said windshield when said last mentioned rib is in engagement with said return bent portion.

3. In combination with a vehicle cowl and a slidable windshield, a supporting strip secured to said cowl, a weather strip having a flat body portion spaced from said supporting strip and having ribs extending along the longitudinal edges thereof, one of said ribs being anchored upon said supporting strip and the other of said ribs having a slidable engagement with said supporting strip, and a projection upon said weather strip intermediate said ribs operable to contact with the windshield upon an engagement of the latter with the weather strip.

4. In combination with a vehicle cowl and windshield, a supporting member secured to said cowl, a weatherstrip having the opposite longitudinal edges thereof engageable with said member, one of said edges being rigidly secured to said member and the other of said edges slidably engageable with said member, and a projection upon said weatherstrip operable to firmly engage said windshield in one position of said sliding edge portion of the weather-strip.

5. In combination with a vehicle cowl and windshield, a supporting member secured to said cowl, a weatherstrip having spaced supporting ribs engageable with said member, one of said ribs being rigidly secured on said member, and the other of said ribs having a sliding engagement with said member, and a projection upon said weatherstrip operable upon a sliding movement of said last mentioned rib to firmly engage said windshield.

6. In combination with a support and a windshield movable relative to the support, a weatherstrip having an intermediate portion spaced from the support and having relatively movable edge portions engageable with the support for supporting the weather strip upon the latter, and a projection extending upwardly from said weatherstrip operable upon a relative movement of said edge portions on the support to firmly engage the said windshield.

7. In combination with a support and a windshield movable relative to the support, a weatherstrip for maintaining a tight seal between the support and windshield when the latter is in closed position, said weatherstrip having one longitudinal edge portion rigidly secured to said support and having the other longitudinal edge portion slidably engaging said support, and a projection upon said weatherstrip operable upon a sliding movement of said longitudinal edge portion in one direction to move into firm engagement with the windshield.

In testimony whereof I affix my signature.

WILLIAM S. PRITCHARD.